US006633744B1

(12) United States Patent
Howell

(10) Patent No.: US 6,633,744 B1
(45) Date of Patent: Oct. 14, 2003

(54) GROUND-BASED SATELLITE COMMUNICATIONS NULLING ANTENNA

(75) Inventor: James M. Howell, Woodstock, GA (US)

(73) Assignee: EMS Technologies, Inc., Norcross, GA (US)

( * ) Notice: Subject to any disclaimer, the term of this patent is extended or adjusted under 35 U.S.C. 154(b) by 0 days.

(21) Appl. No.: 09/415,960

(22) Filed: Oct. 12, 1999

(51) Int. Cl.[7] .......................... H04B 7/185; H04B 7/19; H01Q 3/10; H01Q 1/36; H01Q 15/02

(52) U.S. Cl. .................... 455/12.1; 455/13.2; 455/13.3; 343/757; 343/908; 343/909

(58) Field of Search ............................... 455/12.1, 13.1, 455/13.3, 562, 427, 429; 343/840, 844, 909, 757, 756, 786, 781; 244/158 R

(56) References Cited

U.S. PATENT DOCUMENTS

| | | | | | |
|---|---|---|---|---|---|
| 4,217,592 A | * | 8/1980 | Schwab | ...................... | 343/844 |
| 4,743,919 A | * | 5/1988 | Chang et al. | ............... | 343/914 |
| 4,931,802 A | | 6/1990 | Assal et al. | ................. | 342/356 |
| 5,119,225 A | | 6/1992 | Grant et al. | ................ | 359/172 |
| 5,428,814 A | | 6/1995 | Mort et al. | ................ | 455/12.1 |
| 5,552,920 A | | 9/1996 | Glynn | ........................ | 359/172 |
| 5,913,151 A | * | 6/1999 | Lusignan | .................... | 455/3.2 |
| 6,285,332 B1 | * | 9/2001 | Chandler | .................... | 343/756 |

OTHER PUBLICATIONS

"Microstar® *Plus* Millimeter Wave Radio: 38 GHz North American Digital Hierarchy," Harris Corporation, Quebec, Canada, Jul. 1996.

"Geocast: About Us" and "Geocast: FAQ", Geocast Network Systems, Inc., http://www.geocast.com/about/index.html.

Elbert, Bruce R., "Introduction to Satellite Communication", 2nd Edition, Norwood, MA, 1999, pp. 77–120.

* cited by examiner

*Primary Examiner*—William Trost
*Assistant Examiner*—Meless Zewdu
(74) *Attorney, Agent, or Firm*—King & Spalding, LLP

(57) ABSTRACT

A ground-based antenna for use with a satellite communications (SATCOM) system that reduces interference from geosynchronous earth orbit (GEO) satellites. Because GEO satellites that provide coverage of the continental United States (CONUS) are uniformly separated along an equatorial arc around the earth, the GEO satellites are approximately uniformly separated in sine space when viewed from a ground terminal located within CONUS over typical communications frequency bands, such as the Ka band (29–39 GHz) and the Ku band (10–15 GHz). The invention can reduce interference by providing an uniformly illuminated rectangular aperture, in which the horizontal dimension is chosen so when the aperture is normal to a transmission axis between the antenna and the Nth satellite of a SATCOM systems, the nulls of the antenna radiation pattern align with the N±1, N±2, N±3, . . . satellites. Additionally, the uniformly illuminated rectangular aperture provides the highest illumination efficiency, which has a distribution of sin(x)/x. The aperture may be rotated 45 degrees about transmission axis so that the radiation pattern, along the diagonal of the aperture, which falls off as $[\sin(x)/x]^2$, meets or exceeds the regulatory limits.

27 Claims, 8 Drawing Sheets

GROUND-BASED SATELLITE COMMUNICATIONS NULLING ANTENNA

TECHNICAL FIELD

This invention relates to a ground-based antenna for satellite communications systems using geosynchronous earth orbit satellites and, more particularly, relates to a ground-based antenna that reduces interference from selected satellites by aligning the nulls of the antenna radiation pattern with the interfering satellites.

BACKGROUND OF THE INVENTION

The rapid growth of the Internet and the unavailability of high-speed connections from telephone lines and local cable providers have resulted in an intense search for an alternative high-speed mode of communications. Satellite communications ('SATCOM") systems are a natural selection for replacing conventional land-based communications systems as a means of providing high-speed digital communications links. Furthermore, the broadcast feature of SATCOM systems (i.e., transmitting a signal from a single ground terminal to a satellite for retransmission to a large number of ground terminals over a wide area) also has great potential to the Internet for applications such as "multi-casting" and E-Commerce to a large number of users over a wide area.

Typically, several major obstacles must be overcome to implement a SATCOM system on a wide scale. First of all, antennas used for SATCOM systems tend to be expensive and large to insure that adequate signal strength is received. For example, for an antenna to be able to receive a downlink signal from the satellite, the antenna aperture must have sufficient gain to provide the requisite signal-to-noise ratio to support the required data rate and modulation format. Furthermore, the antenna aperture must be sufficiently large in order to provide a link margin to adequately compensate for environmental effects such as rain, pointing errors, and component degradation.

To transmit an uplink signal, similar design problems exist. For example, the ground-based terminal must use sufficient transmitter power to support the data rate and modulation format and meet the required link margin. However, it is desirable to use the lowest possible transmitter power because the power amplifier is the most expensive component in the ground terminal. Therefore, transmitting at a high power output greatly increases the cost of the ground terminal. One way to keep the cost of the ground terminal low and still meet the link margin is to use an antenna with a large area, and therefore, a high gain. However, this solution is unacceptable to individual users, who demand smaller antennas.

For example, the recently launched ASTRA 1H satellite can receive uplink data at rates up to 2 million bits per second (Mbps) from ground-based terminals. However, in order to achieve these high data rates, the ground-based terminals require antennas with a 48-inch diameter operating with a 2-watt transmitter. Typically, these large antennas are marketed to commercial users due to their large size and high cost. These large diameter antennas are unacceptable to individual consumers due to their large size, which can be obtrusive in a residential community (and in some instances, violative of restrictive covenants) and their high costs.

In an attempt to make SATCOM antennas more appealing to the individual user, makers of SATCOM systems have started to exploit the Ka band of the radio frequency spectrum. In comparison to prior SATCOM systems, operation of a ground-based antenna at the Ka frequency band can result in a reduction in antenna size and decreased power requirements. For example, a SATCOM system using a frequency of 28 GHz (Ka band) for the SATCOM uplink, as opposed to the more typical 12 GHz (Ku band), can reduce the size of the antenna by approximately 43% (12/28). Thus, using the Ka frequency band instead of the Ku frequency band for communicating with a GEO satellite brings the size of the antenna required for SATCOM use more in line with the individual user's expectations.

To ensure that the SATCOM system provides complete coverage of the continental United States ("CONUS"), SATCOM systems employ multiple GEO satellites spaced evenly along the equatorial orbit. For example, a system may station a satellite every two degree (2°) along the equatorial arc over CONUS. The close spacing of the GEO satellites causes the ground terminal to produce undesireduplink interference to adjacent GEO satellites in the equatorial arc. Additionally, the carrier-to-interference (C/I) ratio of the downlink signal is also degraded due to interference from the adjacent satellites stationed in the equatorial arc. The source of the interference is mostly attributable to the radiation pattern of the ground terminal, and more specifically, the strength and direction of the sidelobes of the radiation pattern.

Historically, most manufacturers of antennas have attempted to solve the problem of interference by using a terminal configuration consisting of an offset reflector feed horn in conjunction with a parabolic dish antenna. This configuration produces a "reasonably" low sidelobe radiation pattern resulting from the tapered illumination of the parabolic dish. However, the parabolic dish typically causes the radiation pattern to "broaden," thereby reducing the overall gain of the antenna. In order to reclaim the reduced gain, the size of the parabolic dish must be made larger and therefore, more expensive. The increased size of the antenna increases the strength of the sidelobes, usually beyond the allowable power limits set by regulatory bodies, such as ETSI. To reduce the power transmitted in the sidelobes while still maintaining the required antenna gain, the phase and amplitude errors over the entire parabolic dish must be precisely controlled. This increases the complexity and expense of the ground terminal beyond a cost that most individual consumers are willing to bear.

Thus, there is a general need in the art for small, inexpensive ground-based antennas for SATCOM systems, which operate in the Ka frequency band and meet regulatory body standards, such as ETSI standards. There is a further need in the art for ground-based antennas, which when pointed at the Nth GEO satellite in an equatorial arc, reduce the interference from adjacent satellites within the equatorial arc.

SUMMARY OF THE INVENTION

The present invention meets the above-described needs by providing a ground-based antenna having a uniquely shaped aperture for communications with geosynchronous earth orbit satellites. The uniquely shaped aperture allows the ground-based antenna to maximize the received signal from a GEO satellite in which the ground-based antenna is communicating with while minimizing interference from adjacent GEO satellites.

Generally described, the invention provides a ground-based antenna producing a circularly polarized, far-field radiation pattern having a main lobe and several side lobes. The main lobe points along a transmission axis from the antenna to a first GEO satellite within a constellation of GEO satellites. Each of the satellites in the constellation is equally spaced along an equatorial arc around the earth.

The ground-based antenna contains a uniformly illuminated aperture, which is typically defined by a pair of horizontal side members having a first dimension, and a pair of vertical side members having a second dimension. The horizontal and vertical side members can be connected to form a rectangular aperture lying within a plane perpendicular to the transmission axis.

The horizontal dimension of the aperture is selected so that the nulls of the radiation pattern in the horizontal direction are directed at GEO satellites that are adjacent to the GEO satellite that is positioned within the main lobe of the antenna pattern is directed towards. Furthermore, the second dimension of the pair of vertical members corresponds to the gain of the antenna.

More specifically described, the invention provides a ground-based nulling antenna having a frequency selective-surface covering the aperture. The frequency selective surface has a refractive index that only allows the transmission of a signal having a predefined frequency to pass through to the aperture. Typically, the single frequency will correspond to the uplink frequency for transmission to the GEO satellite. The frequency selective surface reflects all other frequencies.

The frequency selective surface can be shaped as a parabola-shaped reflector. The parabola-shaped reflector may be skewed about the first transmission axis so that reflected energy is directed along a second transmission axis into a feed horn receiver.

The invention may also use a number of dual-polarized radiators to provide a uniform illumination of energy upon the aperture. Each dual polarized radiator is excited by a feed network that is capable of producing a signal having a single polarization or producing two signal having different polarization states. For example, the feed network may produce a single signal that is right-handed circularly polarized. Furthermore, the feed network may produce two signals, each signal having different polarization states, such as a right-handed circular polarization and a left-handed circular polarization.

The aperture of the ground-based antenna also can include a top member with a geometrically-tapered contour. The geometrically-tapered top member has a contour that is calculated to allow each of the nulls form the radiation pattern to fall on at least one of the geosynchronous earth orbit satellites adjacent to the first satellite at which the aperture is pointed. In the alternative, the geometrically-tapered dimension can include the contour of a Gaussian function.

The antenna can include an additional member that bisects the aperture into two separate half-apertures of equal dimensions. One of the half apertures is inverted about the horizontal plane relative to the other half aperture.

The invention may also provide a uniformly-illuminated second aperture comprising a pair of horizontal side members having a first dimension, a top members having a second dimension, and a bottom member having the same geometrically-tapered dimension as the first aperture. The second aperture is placed in close proximity to the first aperture. For example, the bottom member of the first aperture may be placed in contact with the top member of the second aperture. In this manner a larger geometrically tapered aperture that is symmetrical about the horizontal plane may be produced.

The invention also provides for a method for directing a ground-based antenna having a radiation pattern comprising multiple of nulls and lobes generated from a uniformly-illuminated aperture, the uniformly-illuminated aperture having a horizontal dimension and a vertical dimension, on a plurality of geosynchronous earth orbit satellites equally spaced by an angle subtended by the center of the earth. The first step of the method is to make an initial calculation of the horizontal dimension of the aperture so that each of the nulls of the radiation pattern fall on at least one of the geosynchronous earth orbit satellites. The initial calculation of the horizontal dimension is based on the theoretical assumption that the antenna is located at the center of the earth. The theoretical assumption is required because the angle subtended by two adjacent geosynchronous earth orbit satellites is referenced to the center of the earth.

Because a ground-based antenna is located on the earth surface, the angle subtended by two adjacent satellites relative to the ground-based terminal is greater than the theoretical angle subtended by the center of the earth. Consequently, the nulls of the radiation pattern will not be aligned with the interfering satellites in the equatorial arc. Therefore, a correction factor based on the location of the ground-based antenna on the earth surface is required to align the nulls with the GEO satellites. The correction factor can be calculated on a determination of the latitude and longitude of the ground-based antenna. The correction factor is found by determining the degrees of rotation of the aperture about a transmission axis extending normally from the aperture to a geosynchronous earth orbit satellite. Finally, the aperture is rotated about the transmission axis by the calculated degrees of rotation.

Finally, the invention provides a satellite communications system comprising geosynchronous earth orbit satellites that are equally spaced along an equatorial arc around the earth and a ground-based antenna for communicating with at least one of the geosynchronous earth orbit satellites. The ground-based antenna produces a radiation pattern at a first frequency and a first polarization comprising a series of equally spaced lobes separated by a series of nulls. The center lobe is pointed along a transmission axes to the geosynchronous earth orbit satellite, which the ground-based antenna is communicating with. The ground-based antenna has a first dimension that is selected such that nulls of the radiation pattern are aligned with the geosynchronous earth orbit satellites that are adjacent to the first satellite in the equatorial plane.

That the invention improves over the drawbacks of prior ground-based antennas for use with geosynchronous earth orbit satellites and accomplishes the advantages described above will become apparent from the following detailed description of the exemplary embodiments and the appended drawings and claims.

DETAILED DESCRIPTION OF THE EMBODIMENTS

Figure 1:
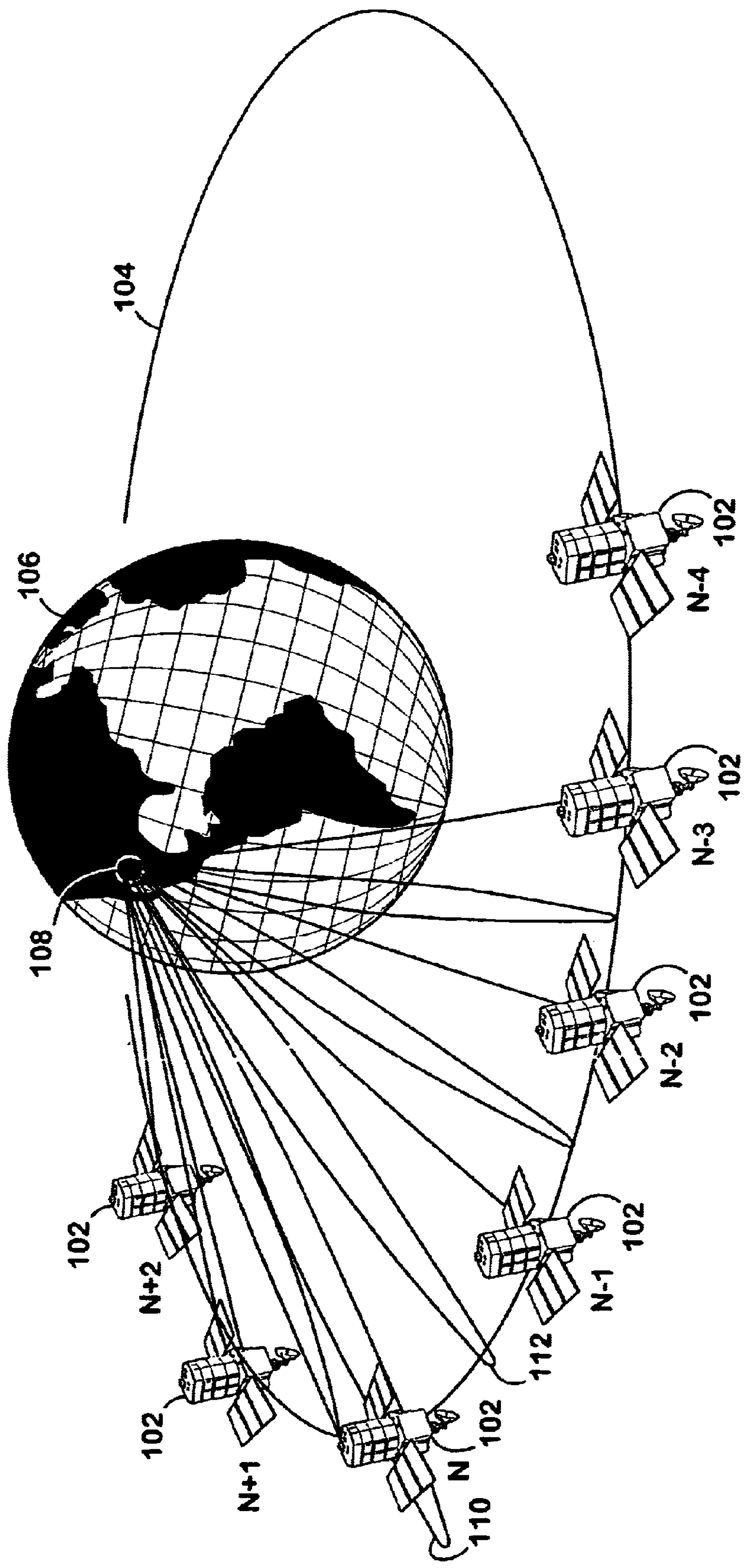
FIG. 1 is an illustration of satellites in a geosynchronous earth orbit communicating with a ground terminal in the continental United States (CONUS).

The present invention is a ground-based antenna for use with a satellite communications (SATCOM) system that reduces interference from geosynchronous earth orbit (GEO) satellites. Because the GEO satellites that provide coverage of the continental United States (CONUS) are uniformly separated along an equatorial arc around the earth, the GEO satellites are approximately uniformly separated in sine space when viewed from a ground terminal located within CONUS over typical communications frequency bands, such as the Ka band (29–39 GHz) and the Ku band (10–15 GHz). The invention can reduce interference by providing an uniformly illuminated rectangular aperture, in which the horizontal dimension is chosen so when the aperture is normal to a transmission axis between the antenna and the Nth satellite of a SATCOM systems, the nulls of the antenna radiation pattern align with the N±1, N±2, N±3, satellites. Additionally, the uniformly illuminated rectangular aperture provides the highest illumination efficiency, which has a distribution of sin(x)/x. The high illumination efficiency of the uniformly illuminated aperture allows for the use of smaller sized antennas as opposed to the larger, conventional tapered antennas, such as parabolic reflectors, to communicate with the GEO satellites. Although the required antenna gain is achieved by increasing the vertical dimension of the aperture, the overall dimension of the aperture is less than a conventional tapered antenna operating at the same frequency. However, increasing the dimensions of the aperture also increases the energy into the sidelobes of the radiation pattern beyond regulatory limits. Therefore, the aperture may be rotated 45 degrees about transmission axis so that the radiation pattern, along the diagonal of the aperture, which falls off as $[\sin(x)/x)]^2$, meets or exceeds the regulatory limits.

In a typical GEO SATCOM system, GEO satellites are uniformly spaced about the equatorial arc, referenced to the center of the earth, to provide complete coverage of CONUS. The angular separation between each satellite may vary for systems operating in different frequency bands. As an example, for SATCOM systems operating in the Ku band, the angular spacing between satellites is typically nine degrees (9°), while the angular spacing for SATCOM systems operating in the Ka band is two degrees (2°). For purposes of this application, the embodiments are described for SATCOM systems operating in the Ka frequency band. However, those skilled in the art will appreciate that the invention may be applied to SATCOM system operating in any frequency band and has satellites stationed in geosynchronous orbit above the earth.

To reduce interference from adjacent satellites in the equatorial arc, the dimension of the antenna in the horizontal direction is calculated so that the nulls of the radiation pattern fall on the satellites adjacent to the satellite at which the antenna is aimed. The angle of separation, Θ, between adjacent satellites may be calculated using the following equation:

$$\sin\Theta = \frac{n\lambda}{Dx}.$$

where λ is the wavelength of the signal and Dx is the horizontal dimension of the aperture. As an example, for a ground terminal located at the equator operating at a frequency of 29.75 GHz that is pointed at the Nth satellite in a constellation of GEO satellites separated every two degrees (2°) in the equatorial arc, the required horizontal dimension of the aperture to align the nulls of the radiation pattern would be 11.376 inches.

However, ground terminals within CONUS do not lie on the equator, but typically lie between 25° and 50° latitude and ±70° longitude. Therefore, the separation angle subtended by the ground terminal will be different than the separation angle subtended by the center of the earth, which causes the interfering satellites to bemisaligned with the nulls. Therefore, the aperture may be rotated about the transmission axis, which is pointed at the Nth satellite, by a corrective angle β, to re-align the interfering satellites with the radiation pattern nulls.

The corrective angle β, may be determined by first calculating the normal vector at the nulling antenna using the equation:

$$\vec{N}=\cos\theta\sin\phi\hat{i}+\sin\theta\hat{j}+\cos\theta\cos\phi\hat{k}$$

The antenna-pointing vector from the nulling antenna to the GEO satellite is defined as $$\vec{P}=Px\hat{i}+Py\hat{j}+Pz\hat{k}$$

$$\vec{P}=\frac{(x_{sat}-x_E)\hat{i}+(y_{sat}-y_E)\hat{j}+(z_{sat}-z_E)\hat{k}}{\sqrt{(x_{sat}-x_E)^2+(y_{sat}-y_E)^2+(z_{sat}-z_E)^2}}$$

where $(x_{sat}, y_{sat}, z_{sat})$ and $(x_E, y_E, z_E)$ are the Cartesian coordinates for the GEO satellite and the ground terminal, respectively.

From the antenna-pointing vector, the azimuth angle (AZ) and the elevation angle (EL) are calculated using the equations $$AZ=\tan^{-1}\left(\frac{Px}{Pz}\right) \quad \text{and} \quad EL=\frac{\pi}{2}-\cos^{-1}(\vec{N}\cdot\vec{P})$$

Next, the vector $\vec{E}$, which is directed due east from the ground terminal is calculated using the equation $$\vec{E}=\cos\phi\hat{i}-\sin\theta\hat{k}$$

Next, the sine space coordinates (u, v) at the ground terminal are calculated using the equations $$\vec{u}=\frac{\vec{E}-(\vec{E}\cdot\vec{P})\vec{P}}{|\vec{E}-(\vec{E}\cdot\vec{P})\vec{P}|}$$

and $$\vec{v}=\vec{P}x\ \vec{u}$$

Next, the sine space vectors, which are rotated around the transmission axis are calculated using the following equations:

$$\hat{u} = \cos\beta\,\vec{u} + \sin\beta\,\vec{v}$$

and $$\hat{v} = \sin\beta\,\vec{u} + \cos\beta\,\vec{v}$$

where β is the angle of rotation required to align the nulls with the interfering satellites.

Therefore, for a rectangular aperture having a horizontal dimension Dx and a vertical dimension Dy, the angle of rotation, β, may be calculated using the equations $$\beta = \cos^{-1}\left(\frac{\lambda}{Dx\Theta}\right), \quad \beta \le \tan^{-1}\left(\frac{Dx}{Dy}\right)$$

$$\beta = \sin^{-1}\left(\frac{\lambda}{Dx\Theta}\right), \quad \beta \ge \tan^{-1}\left(\frac{Dx}{Dy}\right)$$

where Dx is the horizontal dimension of the aperture and Θ is the angular separation between the satellites.

In addition to aligning the nulls of the radiation pattern with the interfering GEO satellites, the height of the sidelobes must also meet standards set by regulatory bodies such, as ETSI for the regulation of the maximum energy stored within the sidelobe peaks. ETSI standards for the transmitter gain are summarized in Table 1.

TABLE 1

ETSI Transmitter Gain Specification

| Angular Spacing, θ (degrees) | ETSI Transmitter Gain (dBi) |
|---|---|
| 1.8° ≦ θ ≦ 7° | 29–25 log θ |
| 7° ≦ θ ≦ 9.2° | 8 |
| 9.2° ≦ θ ≦ 48° | 32–25 log θ |
| θ > 48° | 0 |

Comparing the sidelobes of radiation pattern of the rectangular aperture in the above example, with the ETSI standards, it is clear that a uniformly illuminated aperture does not meet the ETSI standards. The rectangular aperture produces an illumination pattern that falls off as sin(x)/x, and has nulls spaced every two degrees. The amplitude of the first sidelobe located three degrees from the center of the aperture would be 13 dB below the main lobe of the radiation pattern. Therefore for an antenna with a gain of 35 dBi, the first sidelobe has an amplitude of 22 dBi. However, using Table 1, the ETSI standard requires the gain at three degree from the center of an aperture to be 17 dBi.

One method to reduce the energy transmitted in the sidelobe is to set the horizontal and vertical dimensions equal to one another and rotate the aperture by 45°, effectively placing the antenna in a diamond configuration. The diamond configuration is the mathematical equivalent of the convolution of two identical rectangular apertures in the time domain. However, the convolution of two functions in the time domain is the equivalent of multiplying the two functions in the frequency domain. Therefore, the energy of the radiation pattern at a given angle is calculated from the formula:

$$E(\Theta) = \frac{\sin\left(\frac{\pi u Dx}{\lambda}\right)}{\frac{\pi u Dx}{\lambda}} \cdot \frac{\sin\left(\frac{\pi v Dx}{\lambda}\right)}{\frac{\pi v Dx}{\lambda}} = \frac{\sin\left(\frac{\pi\sin(\Theta)Dx}{\sqrt{2}\,\lambda}\right)^2}{\left(\frac{\pi\sin(\Theta)Dx}{\sqrt{2}\,\lambda}\right)^2}$$

where λ is the wavelength of the signal, Dx is the horizontal dimension of the aperture, and $$u = v = \frac{\sin(\Theta)}{\sqrt{2}}.$$

For the nulls of the radiation pattern to align with the GEO satellites in the equatorial arc, the argument of the sine function must be equal to the sine of the satellite spacing and is given by the equation:

$$\frac{\lambda\sqrt{2}}{Dx} = \sin\Theta$$

Solving for Dx, the horizontal dimension or the aperture is given by $$Dx = \frac{\lambda\sqrt{2}}{\sin\Theta}$$

Thus, for the GEO constellation of satellites in the above example, operating at 29.75 GHz and having two degree separation between adjacent satellites, the aperture dimension is calculated to be 9.925 inches, Furthermore, the distribution of the radiation pattern along the diagonal of the aperture is described by the function $[\sin(x)/x]^2$. Therefore, the first sidelobe is 26 dB down from the main lobe and now within the ETSI specification. However, because the beam width is broadened in the diagonal plane due to lower side lobes, the array size must be increased to maintain the required null spacing.

The ground-based nulling antenna may also include a frequency selective surface ("FSS"), which covers the aperture to produce a dual polarization, dual beam antenna. The FSS covers the aperture of the antenna and transmits one frequency while reflecting a second frequency. Typically, the FSS is offset from the transmission axis from the satellite to the antenna so that the shorter frequency is reflected in a different direction along a second transmission axis. For example, the FSS may be a parabolic reflector containing numerous small holes aligned along the normal of the dish and offset from the plane of the aperture. The holes allow the higher frequency to pass through the FSS, while the offset parabola focuses the lower frequency signal along the second transmission axis where it may be collected by a horn-type receiver. As a specific example, an 11 inch square aperture rotated 45 degrees may be covered with a FSS in an offset parabolic reflector configuration that transmits an uplink signal at 28 GHz and is right-hand circular polarized. The downlink signal, which transmits at a frequency of 20 GHz having a left-hand polarization would be reflected along the second transmission axis into a feed horn receiver by the FSS. Thus, in this manner, the single antenna may function as a dual-beam, dual-polarization antenna. One example of using a FSS in an offset parabolic reflector configuration is for a "receive-only" mode. Operating in a receive only mode, the aperture of the nulling antenna may be selected to provide the maximum gain of a downlink signal at the Ka band frequency of 20 GHz. The FSS is then used to "filter out" a direct broadcast signal (DBS) at 12 GHz and reflect the DBS signal along a second transmission path into a feed horn receiver for standard video reception.

Another example of using a FSS in the parabolic dish configuration is for a dual polarization transmit and receive mode. In this mode, the aperture may contain an array of dual polarized radiators, which are fed by wideband feed networks, such as ridge waveguides. The dual polarized radiators could be excited in such a manner that each polarization would support a wideband signal. One polarization, for example, could support reception at both the standard 12 GHz DBS and 20 GHz Ka band downlink signals. The 20 GHz Ka band signal would pass through the FSS while the 12 GHz DBS band signal would be reflected to a feed horn receiver. The second polarization would then be available for transmission of another signal at a different frequency, such as the 28 GHz Ka band uplink signal.

Yet another example of a FSS in a parabolic dish configuration is for a single polarization transmit and receive array, in which two different circularly polarized arrays operate at different frequencies. In this case, the arrays are fed by two different feed networks to produce the proper illumination in the respective apertures. Phasing of the radiation pattern can be used to make the two beams point in different directions while operating at different polarization states. As a specific example, the transmit array may operate at the 28 GHz uplink signal for Ka band using right-hand circular polarization, while the receive array could operate on the 20 GHz downlink signal using left-hand circular polarization. Although the FSS is described as an offset parabolic dish configuration, those skilled in the are will appreciate that other configurations of a FSS may be used to reflect signals at unwanted frequencies without departing from the scope of the invention.

As an alternative embodiment, the ground-based nulling antenna may have a uniformly illuminated aperture, in which at least one side has a geometrical contour. The shape of the contour is selected to achieve a desired radiation pattern in a particular plane. For example, placing the geometrical contour on a horizontal dimension of the aperture produces a shaped radiation pattern in the horizontal plane. Similarly, placing a geometrical contour to the vertical dimension of the aperture may shape the radiation pattern in the vertical plane. However, the geometric contour of the aperture is not unique for a given radiation. pattern. Apertures with different geometrically-shaped sides may produce the same radiation pattern in the same plane. However, each contoured aperture must have the same collapsed illumination to produce identical radiation patterns. Therefore, apertures of varying shapes and size may be used within the same SATCOM system, thereby increasing the number of antenna applications. For example, in a residential neighborhood with restrictive covenants against dish antennas, a geometrically-shaped aperture array could be integrated into the design of a house to allow for satellite communications while still meeting the neighborhood covenants.

FIG. 1 illustrates the orbital configuration of geosynchronous earth orbit SATCOM system. The SATCOM system consists of numerous GEO satellites 102 in an equatorial orbit 104 around the earth 106. Each of the GEO satellites 102 that provide coverage of the continental United States (CONUS) are equally spaced along the equatorial orbit 104. The, spacing is measured by an angle Θ, relative to the center of the earth 106. For example, one SATCOM system operating in the lower frequency Ku band have GEO satellites 102 spaced every nine degrees (9°) along the equatorial orbit 104. However, SATCOM systems operating in the Ka frequency band have GEO satellites 102 spaced every two degrees (2°) along the equatorial orbit 104.

A ground terminal 108 within CONUS is pointed at the Nth GEO satellite 102. Therefore, the main lobe 110 of the radiation pattern falls on the Nth GEO satellite 102. However, to minimize interference from the N±1, N±2, N±3, . . . GEO satellites 102, the dimension of the ground terminal's antenna is designed so that the sidelobes 112 of the radiation pattern fall between the adjacent GEO satellites 102.

Figure 2:
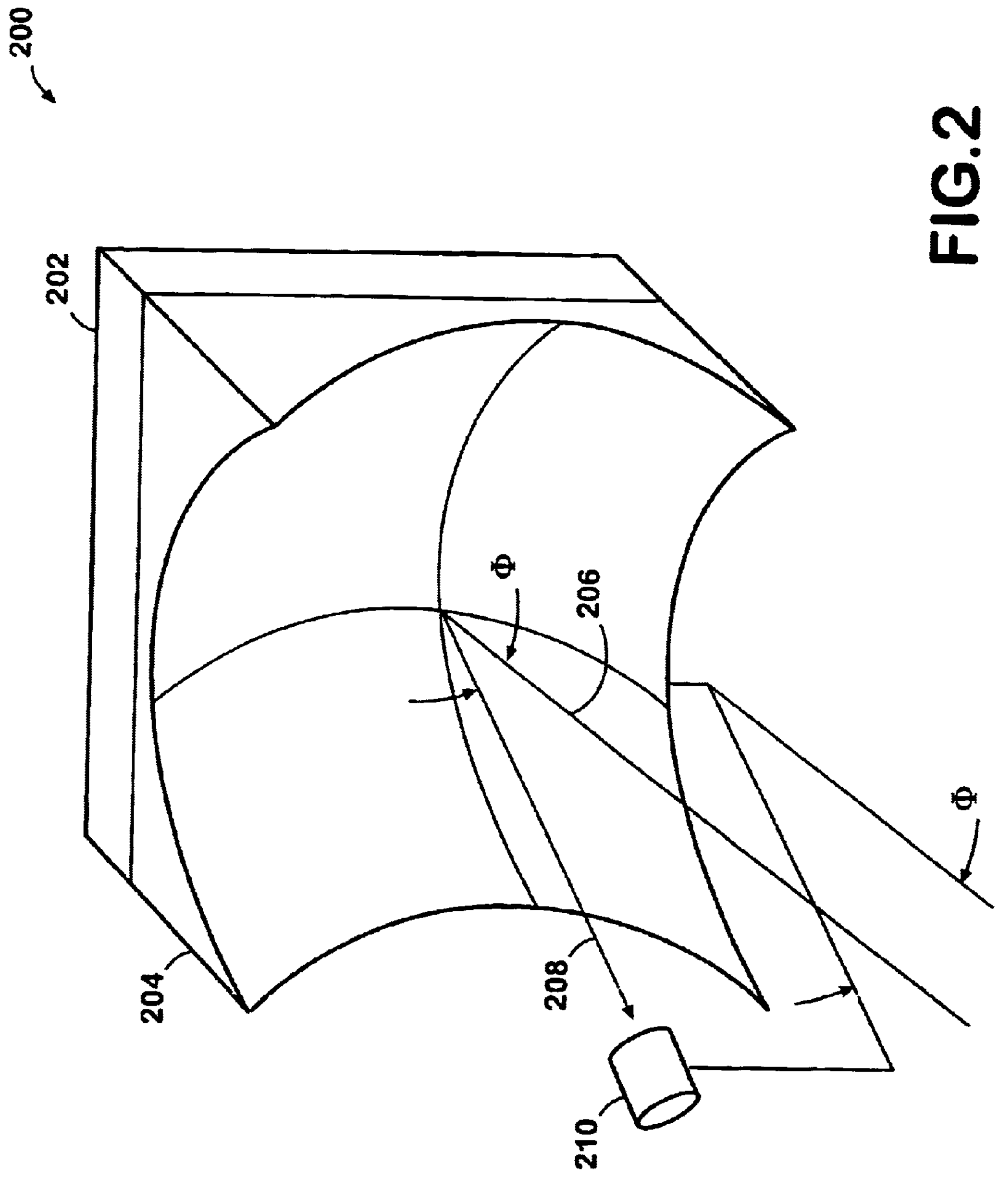
FIG. 2 is an illustration of a rectangular uniformly illuminated aperture covered with a frequency selective surface having a parabolic contour.

FIG. 2 is an illustration of an embodiment of a nulling antenna 200. The nulling antenna consists of a rectangular aperture 202 having a vertical dimension Dy and a horizontal dimension Dx. The nulling antenna may also have a frequency selective surface 204 covering the rectangular aperture 202. Furthermore, the frequency selective surface (FSS) 204 may be shaped, such as a parabolic reflector to produce a dual-polarized, dual beam signal. For example, the ground-based antenna 200 may transmit an uplink signal to a GEO satellite using at a first frequency along a first transmission axis 206 that is normal to the aperture 202. Because the frequency selective surface 204 is transparent to signals at the first frequency, the uplink signal passes through the frequency selective surface 204.

Similarly, the GEO satellite transmits a downlink signal at a second frequency to the ground-based antenna 200. However, index of refraction of the FSS 204 is chosen such that the FSS 204 reflects the downlink signal at the second frequency. Furthermore, the parabolic shape is selected so that the downlink signal is reflected along a second transmission axis 208 into a feed horn receiver 210. Additionally, the reflected signal may have a different polarization than the transmitted signal to minimize interference and allow for maximum frequency use. As an example, an uplink signal in the Ka band may transmit at a frequency of 29.75 GHz and be right-hand circularly polarized. The downlink signal may transmit at 20 GHz and have the opposite polarization from the uplink signal, which in this example would be left-hand circular polarization.

Figure 3:
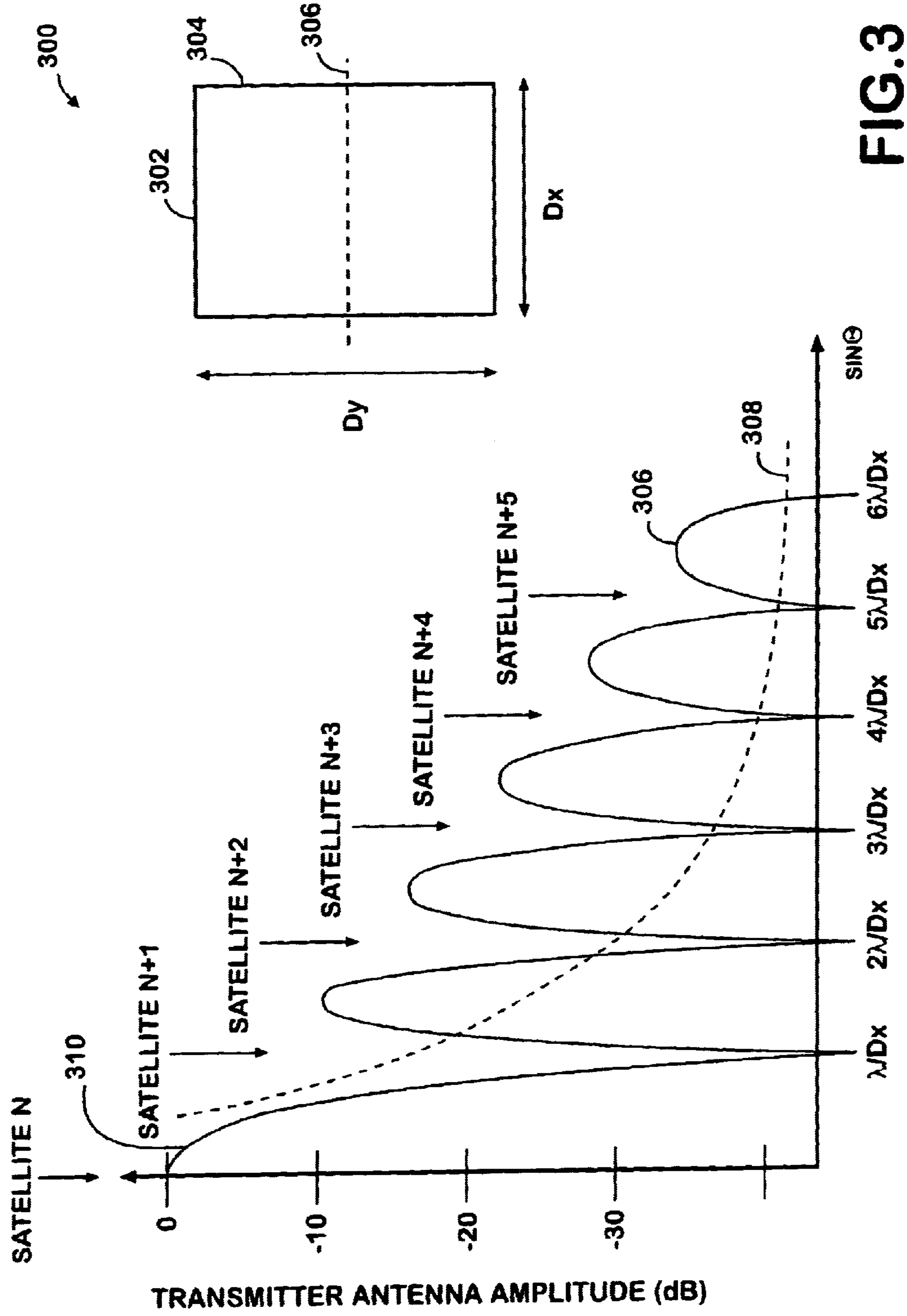
FIG. 3 is an illustration of a radiation pattern from a uniformly illuminated rectangular aperture.

FIG. 3 is an illustration of an exemplary embodiment of the nulling antenna for use with a SATCOM system. The nulling antenna contains a rectangular aperture 300 consisting of a pair of horizontal side members 302 having a dimension Dx and a pair of vertical side members 304 having a dimension Dy. The horizontal dimension Dx is chosen so that the adjacent satellites N±1, N±2, N±3, . . . align with the nulls of the radiation pattern 306 when the satellite orbit 304 is parallel with the horizontal dimensions. The rectangular aperture 300 produces a radiation pattern 306 that has the shape sin(x)/x, where the argument x, is equal to nλ/Dx. The amplitude distribution of this shape produces a first sidelobe 306 that is −13 dBi below the amplitude of the main lobe.

The threshold 308 indicates the maximum energy allowed by the ETSI standard for transmitter gain. As is evident in FIG. 3, the sidelobes produced by the rectangular aperture exceed the allowable threshold 308 set by ETSI standards.

Figure 4:
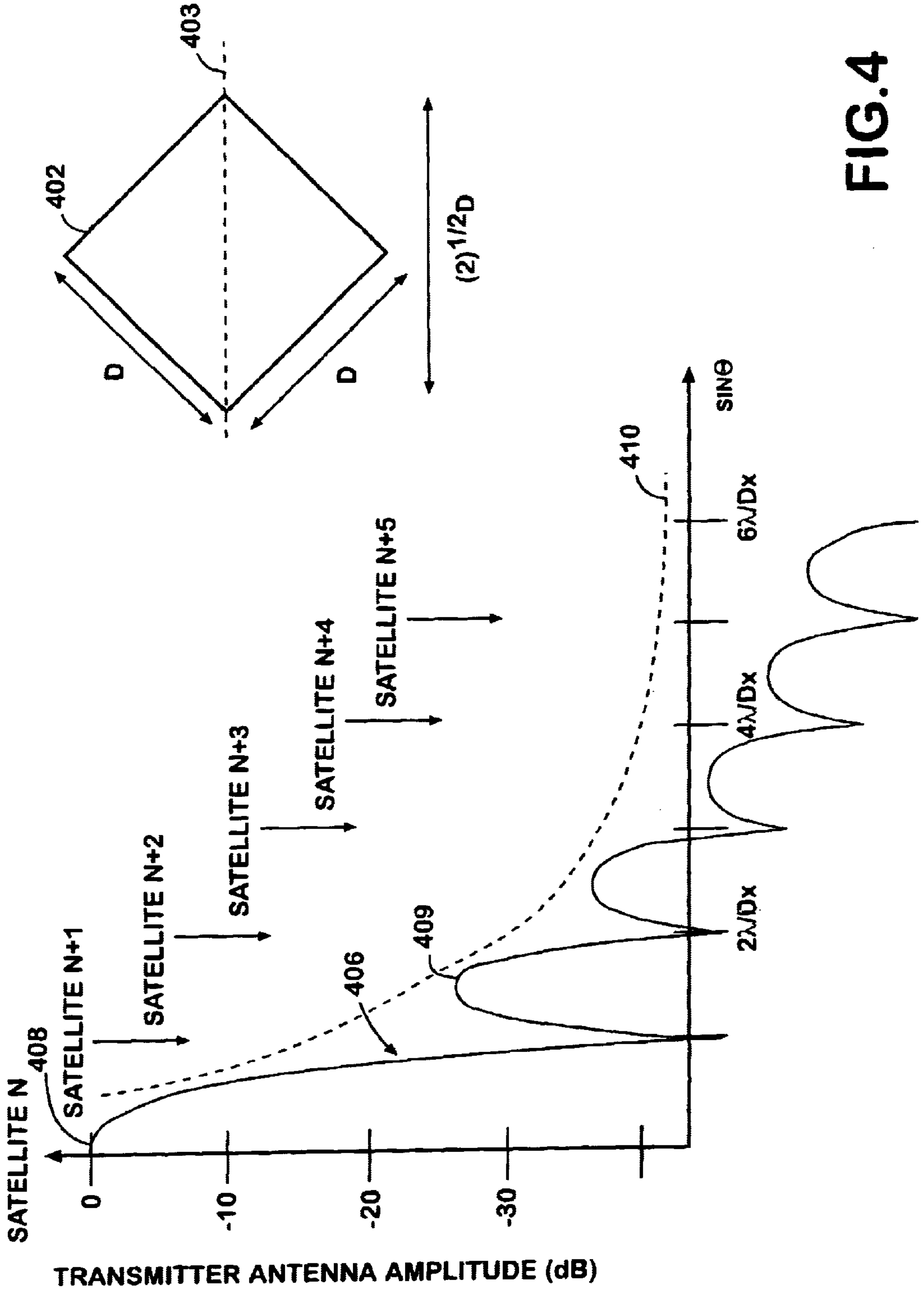
FIG. 4 is an illustration of a radiation pattern from a uniformly illuminated square aperture rotated 45 degrees about the transmission axis.

FIG. 4 is an illustration of a square aperture 402 having vertical and horizontal dimensions D. The aperture 402 is rotated 45 degrees about the transmission axis 208 (FIG. 2) so that the plane of the equatorial orbit 403 is aligned along the diagonal of the aperture 402. The aperture 402 is directed at the Nth satellite so that the main lobe lies upon the transmission axis. The dimension D, of the aperture is selected according to the formula above so that the adjacent satellites (N±1, N±2, N±3, . . . ) line up with the nulls of the radiation pattern 406.

The rotated aperture 402 may be derived by the convolution of two rectangular apertures 302 in the time domain Therefore, the frequency response, or radiation pattern of the rotated aperture will be equal to the square of the frequency response for a single rectangular aperture. Therefore, the radiation pattern 406 in the plane of the equatorial orbit. 404 falls off as $[\sin(x)/x]^2$. Accordingly, the first side lobe 409 is −26 dB down from the main lobe 408. Therefore, by rotating the aperture about the mission axis by 45 degrees, the side lobes now fall within the threshold 410 set by the ESTI standards for transmitter gain.

Figure 5:
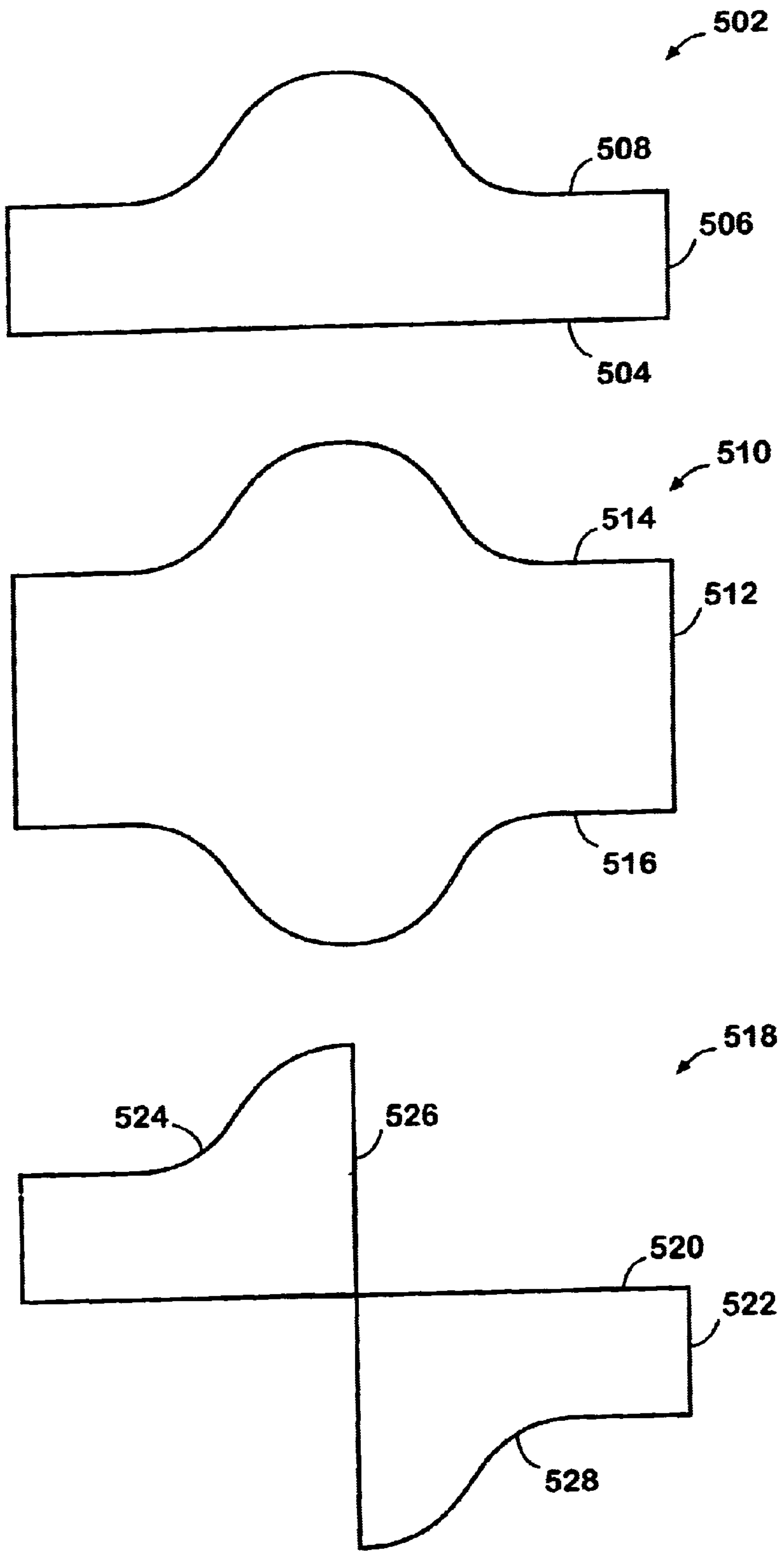
FIG. 5 is an illustration of several geometrically-shaped aperture arrays.
Figure 6:
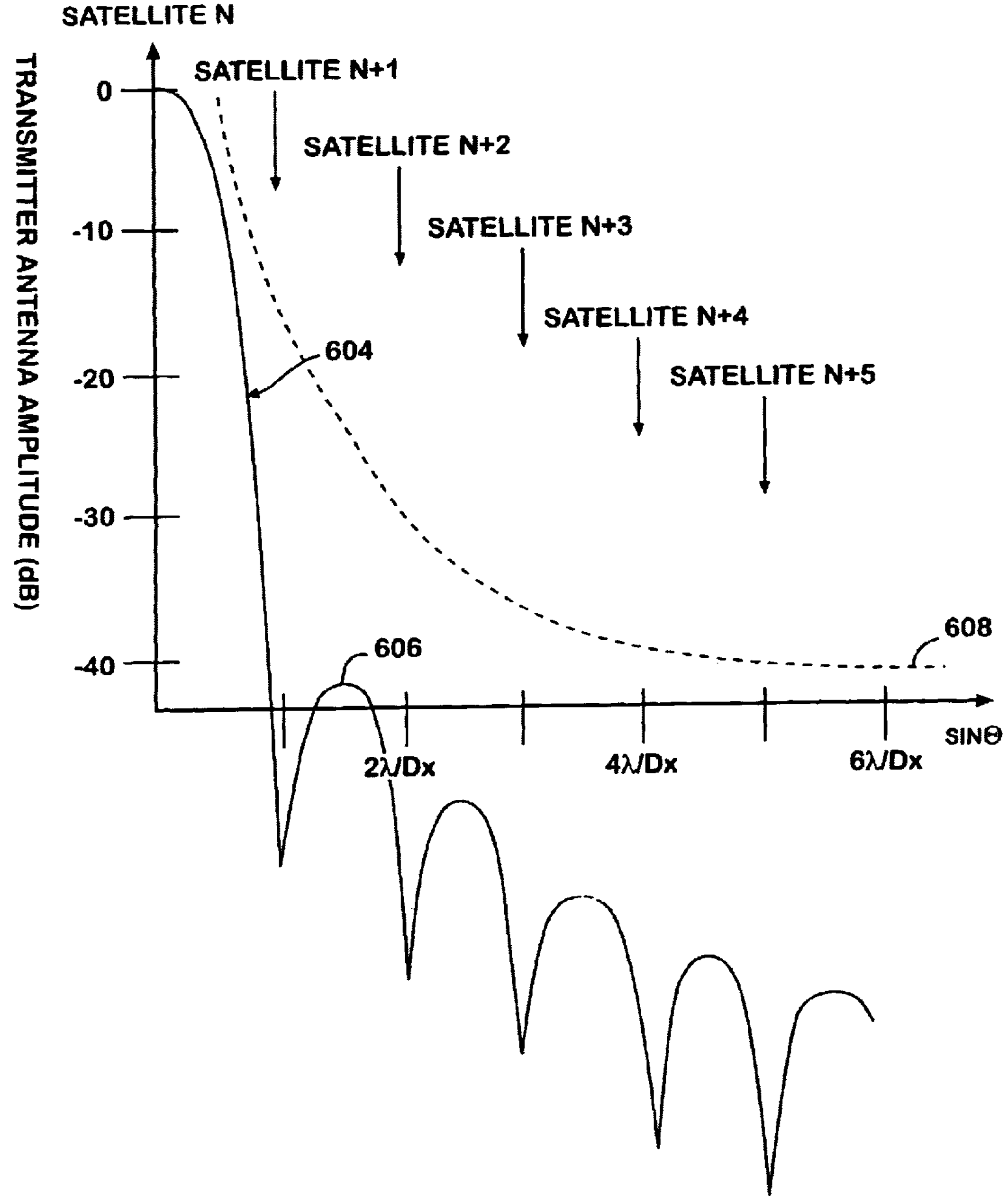
FIG. 6 is an illustration of a radiation patter formed by the geometrically-shaped aperture arrays of FIG. 5.

FIG. 5 is an illustration of three geometrically-shaped apertures, 502, 510, and 518, all of which produce the same radiation pattern 604 in FIG. 6. The first geometrically-shaped aperture 502 contains a horizontal bottom member 504, two vertical side members 506, and a geometrically-shaped top member 508. The geometrically-shaped top member 508 is a Gaussian function. The horizontal dimensions of the geometrically-shaped aperture are chosen so that the nulls of the radiation pattern are aligned with the N±1, N±2, N±3, . . . GEO satellites in the equatorial orbit. However, in order to retain the overall area as the aperture 302, the vertical dimension of the geometrically-shaped aperture is 10% higher than that of the rectangular aperture 302 due to the Gaussian taper. This allows the geometrically-shaped aperture 502 to have the same gain function as the rectangular aperture 302.

The second geometrically-shaped aperture 510 has a pair of vertical side members 512, a geometrically-shaped top member 514 and a geometrically-shaped bottom member 516. The geometrically-shaped top member 514 and the geometrically-shaped bottom member 516 are identical Gaussian functions. The horizontal dimension is selected so that the nulls of the radiation pattern align with the N±1, N±2, N±3, . . . GEO satellites in the equatorial orbit. However, the overall vertical dimension is the same, which produces the same gain function as the first geometrically-shaped aperture 502.

The third geometrically-shaped aperture 518 is derived from the first geometrically-shaped aperture 502 by adding vertical bisecting member 526 to produce two equal halves. One of the two halves is inverted about the bottom member 504. The overall horizontal dimension 520 of the third geometrically-shaped aperture 518 is the chosen so that the nulls of the radiation pattern align with the N±1, N±2, N±3, . . . GEO satellites in the equatorial orbit. Because the overall area of the third geometrically-shaped aperture 518 is the same as the first geometrically-shaped aperture 502, the antenna gain remains unchanged. However, the vertical dimension 526 of the geometrically-shaped aperture 518 is twice that of the geometrically-shaped aperture 502. The third geometrically shaped aperture 518 includes a geometrically shaped top member 224, a geometrically shaped bottom member 528, and a vertical side member 522.

FIG. 6 is an illustration of a radiation pattern 604 which is produced by each of the aperture shapes 502, 510, 518 in FIG. 5. Specifically, tie radiation pattern 604 corresponds to the aperture shapes 502, 510, 518 that have 20 dB Gaussian taper in the horizontal plane. Due to the sharp taper of the Gaussian function, the radiation pattern 604 has a first sidelobe 606 that is −40 dB down from the main lobe, which is well below the threshold 608 established by ETSI standards for transmitter gain.

Figure 7:
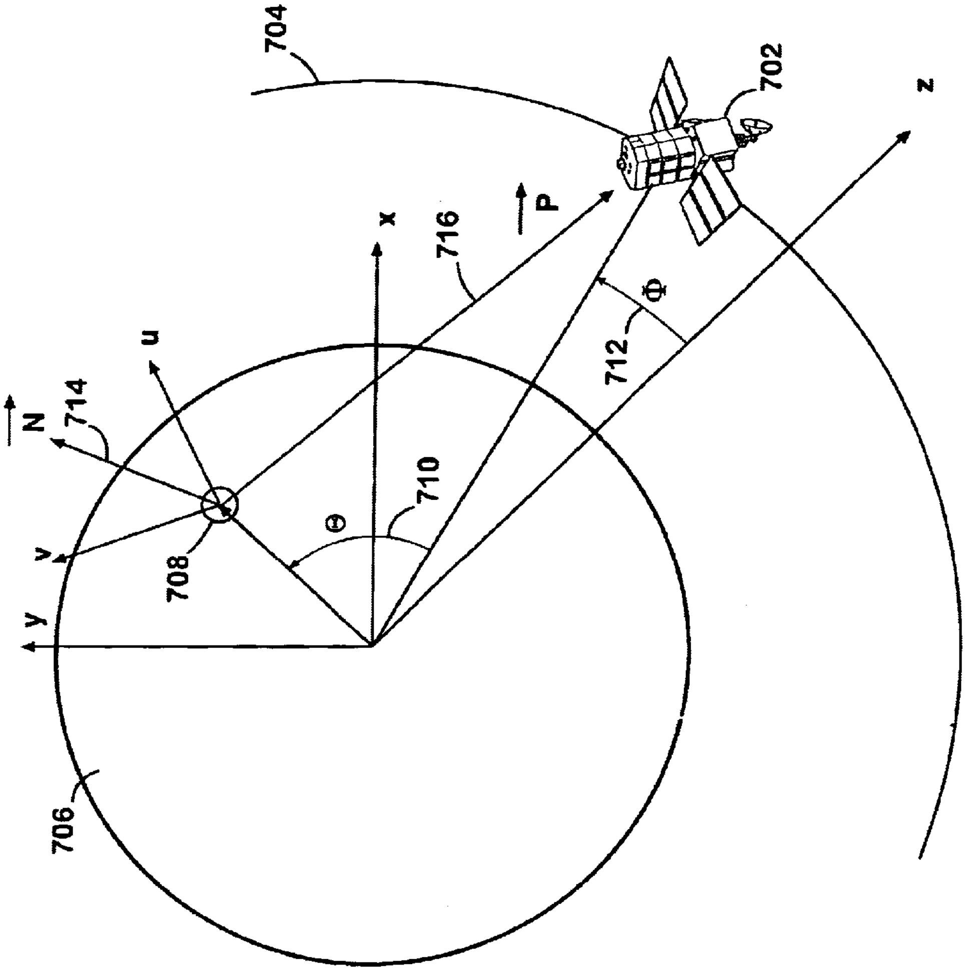
FIG. 7 is an illustration of the geometry between a ground terminal and GEO satellites in an equatorial arc around the earth.

FIG. 7 is a diagram illustrating the geometrical relationship between a ground terminal 708 and a GEO satellite 702 in an equatorial arc 704 around the earth 706. The location of the ground terminal 708 on the earth 706 is defined by a latitude, θ 710 and a longitude, ϕ 712 relative to the center of the earth. The ground terminal 708 is mapped into sine space having coordinates (u, v) and normal vector 714. Mapping the ground terminal 708 into sine space coordinates allows for the calculation of the separation angle between adjacent satellites subtended by the ground terminal, rather than the center of the earth. A Pointing vector 716 indicates the direction that the ground terminal 708 is aimed at the Nth GEO satellite 702.

Figure 8:
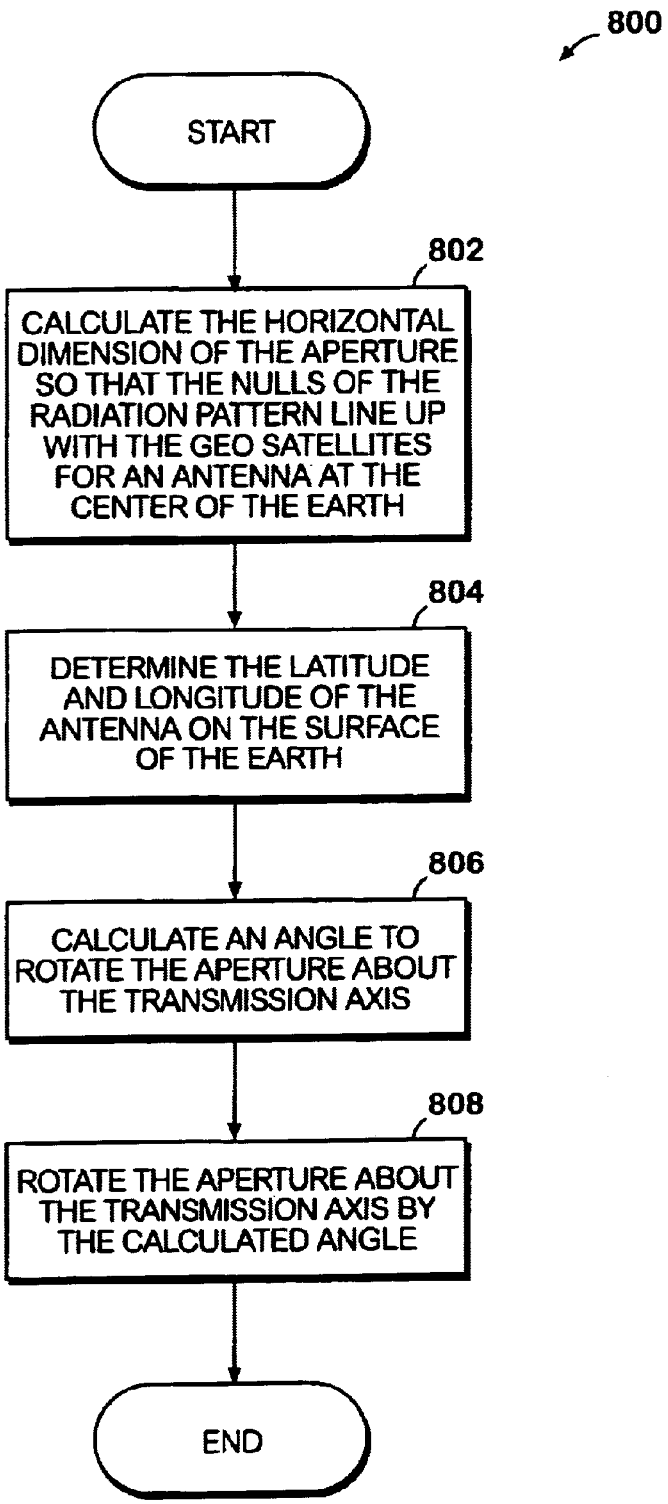
FIG. 8 is a logic flow diagram illustrating a routine for determining the angle of rotation of a uniformly illuminated aperture about its transmission axis to align the nulls of the radiation pattern on interfering satellites in a geosynchronous earth orbit.

FIG. 8 is a logic flow diagram illustrating a routine 800 for calculating the rotation angle required to place the nulls of the radiation pattern from the nulling antenna located on the earth surface. The angular spacing of the GEO satellites is defined relative to the center of the earth. However, because the nulling antenna is on the surface of the earth, the angle subtended by the antenna is greater than the angular separation subtended by the center of the earth. This difference in angular separation causes the nulls of the radiation pattern to bemisaligned with the GEO satellites. However, the misalignment of the null spacing and the interfering GEO satellites can be corrected by rotating the aperture by an angle, β.

Routine 800 begins at step 802, in which the horizontal dimension of the aperture is calculated so that the nulls of the antenna pattern line up with the GEO satellites in the equatorial arc based on the antenna being located at the center of the earth. The horizontal dimension, Dx, is found using the equation:

$$Dx = \frac{n\lambda}{\sin\Theta}$$

where λ is the wavelength of the signal and Θ is the angular separation of the GEO satellites.

Step 802 is followed by step 804, in which the latitude, θ and longitude, ϕ of the nulling antenna at the earth surface is determined. Step 804 is followed by step 806, in which the corrective angle β, t is calculated. The calculation begins by transforming the (x, y, z) coordinates of the ground terminal into sine space coordinates (u, v), previously describe in detail. Once the sine space coordinates (u, v) have been calculated, the required angle of rotation, β, is calculated from the equations:

$$\beta = \cos^{-1}\left(\frac{\lambda}{Dx\Theta}\right), \quad \beta \le \tan^{-1}\left(\frac{Dx}{Dy}\right)$$

$$\beta = \sin^{-1}\left(\frac{\lambda}{Dx\Theta}\right), \quad \beta \ge \tan^{-1}\left(\frac{Dx}{Dy}\right)$$

Step 806 if followed by step 808, in which the aperture is rotated about the transmission axis by the angle β. By rotating the aperture by the additional angle β, the nulls of the antenna pattern re-align with the N±1, N±2, N±3, . . . GEO satellites interfering with the ground terminal. Finally, step 808 is followed by the “END” step.

The present invention thus provides a ground-based SATCOM antenna for communications with a desired satellite in a geosynchronous orbit, which reduces interference by aligning the nulls of the radiation pattern with the satellites adjacent to the desired satellite in the equatorial plane.

It should be understood that the foregoing pertains only to the preferred embodiments of the present invention, and that numerous changes may be made to the embodiments described herein without departing from the spirit and scope of the invention.

What is claimed is:

1. A ground-based antenna having a radiation pattern transmitting a first frequency at a first polarization, the radiation pattern comprising a plurality of lobes separated by a plurality of equally spaced nulls, wherein at least one lobe is directed along a transmission axis from the antenna to a first satellite of a plurality of geosynchronous earth orbit satellites equally spaced along an equatorial arc around the earth, the antenna, comprising:

a uniformly illuminated aperture comprising a pair of horizontal side members having a first dimension and a pair of vertical side members having a second dimension, defining a plane perpendicular to the transmission axis, wherein the first dimension is proportional to the separation between each equally-spaced null, such that each of the plurality of equally-spaced nulls are directed on at least one of the plurality of geosynchronous earth orbit satellites adjacent to the first satellite.

2. The antenna of claim 1, wherein the second dimension corresponds to an antenna gain function.

3. The antenna of claim 1, wherein the first dimension is equal to the second dimension and the aperture is rotated by a first degree about the transmission axis.

4. The antenna of claim 1, further comprising:

a frequency selective surface operable for the transmission of a signal having a first frequency at a first polarization along the transmission axis and operable for reflection of a second signal having a second frequency at a second polarization.

5. The antenna of claim 4, wherein the frequency selective surface is shaped as a parabolic reflector operable for reflecting the second signal having the second frequency at the second polarization along a second transmission axis.

6. The antenna of claim 5, further comprising a feed horn directed along the second transmission path for receiving the second signal.

7. The antenna of claim 6, further comprising:

a plurality of dual-polarized radiators; and a feed network operable to excite each of dual polarized radiators.

8. The antenna of claim 7, wherein the feed network is a ridge waveguide.

9. A ground-based antenna having a radiation pattern comprising a plurality of lobes separated by a plurality of equally spaced nulls, wherein at least one lobe being directed along a transmission axis from the antenna to a first satellite of a plurality of a geosynchronous earth orbit satellites equally spaced along an equatorial arc around the earth, the one lobe bang transmitted along a transmission axis, comprising:

a uniformly illuminated first aperture comprising a plurality of side members connected to form a planar surface, wherein at least one side member has a geometrically-shaped contour calculated to achieve a given far-field pattern such that nulls from the far-field pattern fall on at least one of the geosynchronous earth orbit satellites adjacent to a satellite at which the aperture is pointed, the first aperture comprising an array of active radiators that form the side members; and a uniformly illuminated second aperture comprising a pair of vertical side members spaced apart and connected to a top member and a bottom member having the geometrically-shaped dimension, wherein the top member of the uniformly illuminated second aperture is located approximate to the bottom member of the uniformly illuminated first aperture.

10. The antenna of claim 9, further comprising:

a frequency selective surface operable for the transmission of a first signal at a first frequency having a first polarization along the transmission axis and operable for reflection of a second signal having a second frequency at a second polarization.

11. The antenna of claim 10, wherein the frequency selective surface is shaped as a parabolic reflector operable for reflecting the second frequency along a second transmission axis.

12. The antenna of claim 11, further comprising:

a feed horn directed along the second transmission path operable to receive the second signal having the second frequency at the second polarization;

wherein the array further comprises:

a plurality of dual-polarized radiators; and a feed network operable to-excite each of the dual polarized radiators.

13. The antenna of claim 12, wherein the feed network is a ridge waveguide.

14. The antenna of claim 9, wherein the plurality of side members comprises a pair of vertical side members spaced apart and connected to a bottom member and a top member having the geometrically-shaped contour, wherein the geometrically-shaped contour is a Gaussian function.

15. The antenna of claim 9, further comprising:

a frequency selective surface operable for the transmission of the first frequency along the transmission axis and operable for reflection of a second frequency.

16. The antenna of claim 15, wherein the frequency selective surface is shaped as a parabolic reflector operable for reflecting the second frequency along a second transmission axis.

17. The antenna of claim 16, further comprising: a feed horn lying in a plane between the aperture plane and the geosynchronous earth orbit satellite, directed along the second transmission path.

18. The antenna of claim 16, wherein the array further comprises:

a plurality of dual-polarized radiators; and a feed network operable to excite each of the dual polarized radiators.

19. The antenna of claim 18, wherein the feed network is a ridge waveguide.

20. A method for directing a ground-based antenna having a radiation pattern comprising a plurality of nulls and a plurality of lobes generated from a uniformly illuminated aperture having a horizontal dimension and a vertical dimension, on a plurality of geosynchronous earth orbit satellites equally spaced by an angle subtended by the center of the earth, comprising the steps of:

calculating the horizontal dimension of the aperture so that the plurality of nulls of the radiation pattern align with the plurality of geosynchronous satellites;

determining a location of the ground-based antenna on an earth surface, that causes the nulls of the radiation pattern to fall out of alignment with the plurality of geosynchronous satellites;

calculating an angle of rotation about a transmission axis extending normally from the aperture to at least one geosynchronous earth orbit satellite to realign the plurality of nulls of the radiation pattern with the plurality of geosynchronous satellites, wherein the angle of rotation is dependent upon the location of the ground-based antenna on the earth surface; and rotating the aperture about the transmission axis by the angle of rotation to realign the nulls of the radiation pattern with the plurality of geosynchronous satellites.

21. A satellite communications system, comprising:

a plurality of geosynchronous earth orbit satellites equally spaced in an equatorial arc around the earth; and a ground-based antenna having a radiation pattern transmitting a first frequency at a first polarization, the radiation pattern comprising a plurality of lobes separated by a plurality of equally spaced nulls, wherein at least one lobe is directed along a transmission axis from the antenna to a first satellite of a plurality of geosynchronous earth orbit satellites, wherein the ground-based antenna has a first dimension proportional to the separation between each equally-spaced null, such that each of the plurality of equally-spaced nulls are directed on at least one of the plurality of geosynchronous earth orbit satellites adjacent to the first satellite.

22. The satellite communications systems of claim 21, wherein the antenna further comprises:

a uniformly illuminated aperture comprising a plurality of side members connected to form a planar surface, wherein at least one side member has a geometrically-shaped contour to achieve a given radiation pattern.

23. The satellite communications systems of claim 21, wherein the antenna further comprises:

a frequency selective surface operable for the transmission of a signal having a first frequency at a first polarization along the transmission axis and operable for reflection of a second signal having a second frequency at a second polarization.

24. The satellite communications systems of claim 23, wherein the frequency selective surface is shaped as a parabolic reflector operable for reflecting the second signal having the second frequency at the second polarization along a second transmission axis.

25. The satellite communications systems of claim 23, wherein the antenna further comprises a feed horn directed along the second transmission path for receiving the second signal.

26. The satellite communications systems of claim 24, wherein the antenna further comprises:

a plurality of dual-polarized radiators; and a feed network operable to excite each of dual polarized radiators.

27. The satellite communications systems of claim 26, wherein the feed network is a ridge waveguide.

* * * * *